(12) United States Patent
Tang et al.

(10) Patent No.: US 9,411,406 B2
(45) Date of Patent: Aug. 9, 2016

(54) SRAM REGULATING RETENTION SCHEME WITH DISCRETE SWITCH CONTROL AND INSTANT REFERENCE VOLTAGE GENERATION

(71) Applicant: Apple Inc., Cupertino, CA (US)

(72) Inventors: Bo Tang, Sunnyvale, CA (US); Ajay Kumar Bhatia, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 13/921,475

(22) Filed: Jun. 19, 2013

(65) Prior Publication Data

US 2014/0380068 A1 Dec. 25, 2014

(51) Int. Cl.
G06F 1/26 (2006.01)
G06F 1/32 (2006.01)
G05F 1/46 (2006.01)

(52) U.S. Cl.
CPC .............. G06F 1/3275 (2013.01); G05F 1/468 (2013.01); G06F 1/26 (2013.01); G06F 1/32 (2013.01)

(58) Field of Classification Search
CPC ......................................................... G06F 1/26
See application file for complete search history.

(56) References Cited

U.S. PATENT DOCUMENTS

| 5,378,936 | A * | 1/1995 | Kokubo et al. | 327/77 |
|---|---|---|---|---|
| 5,877,719 | A * | 3/1999 | Matsui et al. | 341/155 |
| 6,707,724 | B2 * | 3/2004 | Kim et al. | 365/189.09 |
| 6,738,298 | B1 | 5/2004 | Cioaca et al. | |
| 6,930,948 | B2 | 8/2005 | Lee et al. | |
| 8,351,279 | B2 | 1/2013 | Tang et al. | |
| 2006/0028193 | A1 * | 2/2006 | Migliavacca | 323/316 |
| 2009/0046532 | A1 | 2/2009 | Gouin | |

* cited by examiner

*Primary Examiner* — Kim Huynh
*Assistant Examiner* — Eric Chang
(74) *Attorney, Agent, or Firm* — Meyertons, Hood, Kivlin, Kowert & Goetzel, P.C.

(57) ABSTRACT

A system including control logic, a voltage reference, a sense amplifier, and a voltage supply circuit is presented. The sense amplifier may be configured to detect a current state of the voltage supply circuit output compared to the reference voltage. The voltage supply circuit may be configured to capture and preserve the current state to be used as a previous state. The voltage regulator may be configured to compare the current state to one or more previous states and adjust the voltage regulator output based on the comparison. Control logic may be configured to enable the voltage reference output in response to a signal. Control logic may be configured to enable the sense amplifier at a time after the voltage reference is stable. Control logic may be configured to disable the voltage reference output in response to the sense amplifier generating an output.

20 Claims, 8 Drawing Sheets

SRAM REGULATING RETENTION SCHEME WITH DISCRETE SWITCH CONTROL AND INSTANT REFERENCE VOLTAGE GENERATION

BACKGROUND

1. Technical Field

This invention is related to the field of integrated circuit implementation, and more particularly to the implementation of power supply management circuits.

2. Description of the Related Art

Computing systems may include one or more systems on a chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Since many functional blocks, such as memories, timers, serial ports, phase-locked loops (PLLs), analog-to-digital converters (ADCs) and more, may be included in an SoC, the probability that a given functional block is not in use at a given time may be high. When a functional block is not in use, the SoC may turn the block off by disabling power to it to conserve power, to reduce the internal chip operating temperature, and the like. However, when the functional block is needed again, power must be turned back on and the block must be initialized. Any data or operational settings stored in the functional block are lost when power is disabled.

In some SoC designs, functional blocks that are not used all of the time may be placed into a retention mode. In a retention mode, clock signals to the functional block may be disabled and the power supply to the block may be reduced to a level that allows the block to retain some or all of the operational settings and/or data contained within the block. This may allow some power savings or temperature reduction without a functional block requiring to be re-initialized when it is needed again. In order to implement a retention mode, a power supply with a voltage level below the main system operating voltage may be required. In addition, it is desirable to implement this power supply with minimal impact to the total chip power consumption.

Power regulation circuits may be designed in accordance with various designs styles including passive and active designs. Passive regulating circuits may employ a voltage drop across a passive circuit element such as, e.g., a resistor or a diode, to generate a voltage level below the main system operating voltage.

The flexibility to control the voltage output may be provided by using active power regulating circuits. Active power regulating circuits allow control over the voltage output by monitoring the output and comparing the output to one or more known voltage references. The output may be adjusted higher or lower based on this comparison.

SUMMARY OF THE EMBODIMENTS

Various embodiments of a power management apparatus are disclosed. Broadly speaking, an apparatus and a method are contemplated in which the apparatus includes a reference voltage circuit configured to provide one or more analog voltage levels in response to being enabled, and a voltage generation circuit coupled to the reference voltage circuit. The voltage generation circuit may be configured to enable the reference voltage circuit and receive one of the analog voltage levels from it. The voltage generation circuit may be configured to generate an output signal with a voltage level dependent upon the received analog voltage level. The voltage generation circuit may be configured to compare the output signal to the received analog voltage at a time after the reference voltage circuit was enabled, thereby establishing a current operational state of the voltage generation circuit. The reference voltage circuit may be disabled at a time after the comparison is made. The voltage generation circuit may be further configured to store this current operational state and then adjust the output voltage level based on one or more of the stored operational states.

In another embodiment, a sense amplifier circuit may be used within the voltage generation circuit to perform the comparison of the received analog voltage to the voltage generation circuit's output signal. The sense amplifier may be further configured to output one or more digital signals dependent upon the comparison.

In a further embodiment, the sense amplifier may be configured to output two complementary digital signals in response to successfully comparing the output signal to the received analog voltage. The complementary digital signals from the sense amplifier may be used to disable the reference voltage signal.

A periodic signal may be sent to the apparatus in another embodiment. In response to detecting a rising or a falling edge in the periodic signal, the voltage generating circuit may be configured to enable the reference voltage circuit. In response to determining the reference voltage circuit is ready, the voltage generation circuit may be configured to begin a comparison between the output signal and the received analog voltage.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system-on-a-chip (SoC) may include one or more functional blocks, such as, e.g., memories and power supplies, which may integrate the function of a computing system onto a single integrated circuit. Since an SoC may integrate multiple features into a single circuit, they are a popular choice for portable devices where space for components is limited.

To reduce power consumption in some SoC designs, multiple power supply voltages may be generated within the SoC to provide power to various functional blocks. In some embodiments, each power supply voltage may be employed for operating a functional block in a different operational mode. For example, one of the generated power supply voltages may be lower than a nominal supply voltage in order to conserve power or to prevent damage to the circuit. A suitable voltage may be higher than the nominal supply voltage to improve performance or for proper operation of the circuit. The suitable voltage for a given feature may change during operation as the features moves from one state to another, such as, for example, a random access memory (RAM) transitioning from a fully operational read and write state, which may require a voltage equal to the nominal supply voltage, to a lower power retention state in which the memory values are retained, but data cannot be read or written, which may require a voltage less than the nominal supply voltage. Another example is a flash memory which may require a voltage greater than the nominal supply voltage to write data but may only require a voltage equal to the nominal supply voltage to read data.

Multiple supply voltages may be obtained through the use of various circuits. In some embodiments, a voltage greater than the primary power supply voltage may be generated using a charge pump, a voltage doubler, or any other suitable power supply generation circuit. In other embodiments, a voltage less that the primary power supply voltage may be generated by employing a voltage regulator, a voltage divider, or any other suitable circuit.

Various embodiments of a voltage regulation system are described in this disclosure. The embodiments illustrated in the drawings and described below may provide techniques for providing controllable voltages to peripheral circuits within a computing system.

Circuit Design Overview

Many terms commonly used in reference to SoC designs are used in this disclosure. For the sake of clarity, the intended definitions of some of these terms, unless stated otherwise, are as follows.

A Metal-Oxide Semiconductor Field-Effect Transistor (MOSFET) describes a type of transistor that may be used in modern digital logic designs. MOSFETs are designed as one of two basic types, n-channel and p-channel. N-channel MOSFETs open a conductive path between the source and drain when a positive voltage greater than the transistor's threshold voltage is applied between the gate and the source. P-channel MOSFETs open a conductive path when a voltage greater than the transistor's threshold voltage is applied between the drain and the gate.

Complementary MOSFET (CMOS) describes a circuit designed with a mix of n-channel and p-channel MOSFETs. In CMOS designs, n-channel and p-channel MOSFETs may be arranged such that a high level on the gate of a MOSFET turns an re-channel transistor on, i.e., opens a conductive path, and turns a p-channel MOSFET off, i.e., closes a conductive path. Conversely, a low level on the gate of a MOSFET turns a p-channel on and an n-channel off. In addition, the term transconductance is used in parts of the disclosure. While CMOS logic is used in the examples, it is noted that any suitable digital logic process may be used for the circuits described in this disclosure.

It is noted that "high" or "high logic level" refers to a voltage sufficiently large to turn on a n-channel metal-oxide semiconductor field-effect transistor (MOSFET) and turn off a p-channel MOSFET while "low" or "low logic level" refers to a voltage that is sufficiently small enough to do the opposite. In other embodiments, different technology may result in different voltage levels for "low" and "high."

The embodiments illustrated and described herein may employ CMOS circuits. In various other embodiments, however, other suitable technologies may be employed.

System-on-a-Chip Overview

Figure 1:
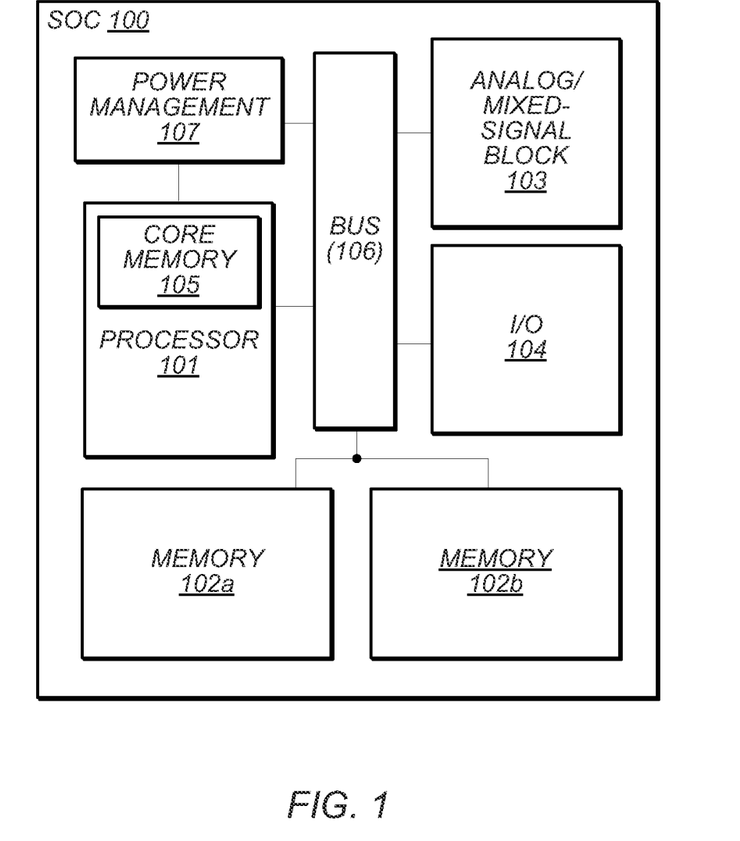
FIG. 1 illustrates an embodiment of a system-on-a-chip.

A block diagram of an SoC is illustrated in FIG. 1. In the illustrated embodiment, the SoC 100 includes a processor 101 coupled to memory blocks 102a and 102b, an analog/mixed-signal block 103, an I/O block 104, and a power management unit 107, through a system bus 106. Processor 101 is also coupled directly to a core memory 105. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores. In some embodiments, processor 101 may include one or more register files and memories.

In some embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory blocks 102a and 102b, for example.

Memory 102a and memory 102b may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or a Magnetoresistive Random Access Memory (MRAM), for example. Some embodiments may include single memory, such as memory 102a and other embodiments may include more than two memory blocks (not shown). Memory 102a and memory 102b may be multiple instantiations of the same type of memory or may be a mix of different types of memory. In some embodiments, memory 102a and memory 102b may be configured to store program instructions that may be executed by processor 101. Memory 102a and memory 102b may, in other embodiments, be configured to store data to be processed, such as graphics data, for example.

Analog/mixed-signal block 103 may include a variety of circuits including, for example, a crystal oscillator, a phase-locked loop (PLL) or delay-locked loop (DLL), an analog-to-digital converter (ADC), and a digital-to-analog converter (DAC) (all not shown). In some embodiments, analog/mixed-signal block 103 may also include, in some embodiments, radio frequency (RF) circuits that may be configured for operation with cellular telephone networks. Analog/mixed-signal block 103 may include one or more voltage regulators to supply one or more voltages to various functional blocks and circuits within those blocks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 104 may be configured to perform the data processing necessary to implement an Ethernet (IEEE 802.3) networking standard.

Core memory 105 may be configured to store frequently used instructions and data for the processor 101. Core memory 105 may be comprised of SRAM, DRAM, or any other suitable type of memory. In some embodiments, core memory 105 may be a part of a processor core complex (i.e., part of a cluster of processors) as part of processor 101 or it may be a separate functional block from processor 101. In some embodiments, core memory may be a cache memory.

System bus 106 may be configured as one or more buses to couple processor 101 to the other functional blocks within the SoC 100 such as, e.g., memory 102a, and I/O block 104. In some embodiments, system bus 106 may include interfaces coupled to one or more of the functional blocks that allow a particular functional block to communicate through the link. In some embodiments, system bus 106 may allow movement of data and transactions between functional blocks without intervention from processor 101. For example, data received through the I/O block 104 may be stored directly to memory 102a.

Power management unit 107 may be configured to manage power delivery to some or all of the functional blocks included in SoC 100. Power management unit 107 may include sub-blocks for managing multiple power supplies for various functional blocks. Power management unit 107 may receive signals that indicate the operational state of one or more functional blocks. In response to the operational state of a functional block, power management unit may adjust the output of a power supply.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltage levels.

System Overview

Figure 2:
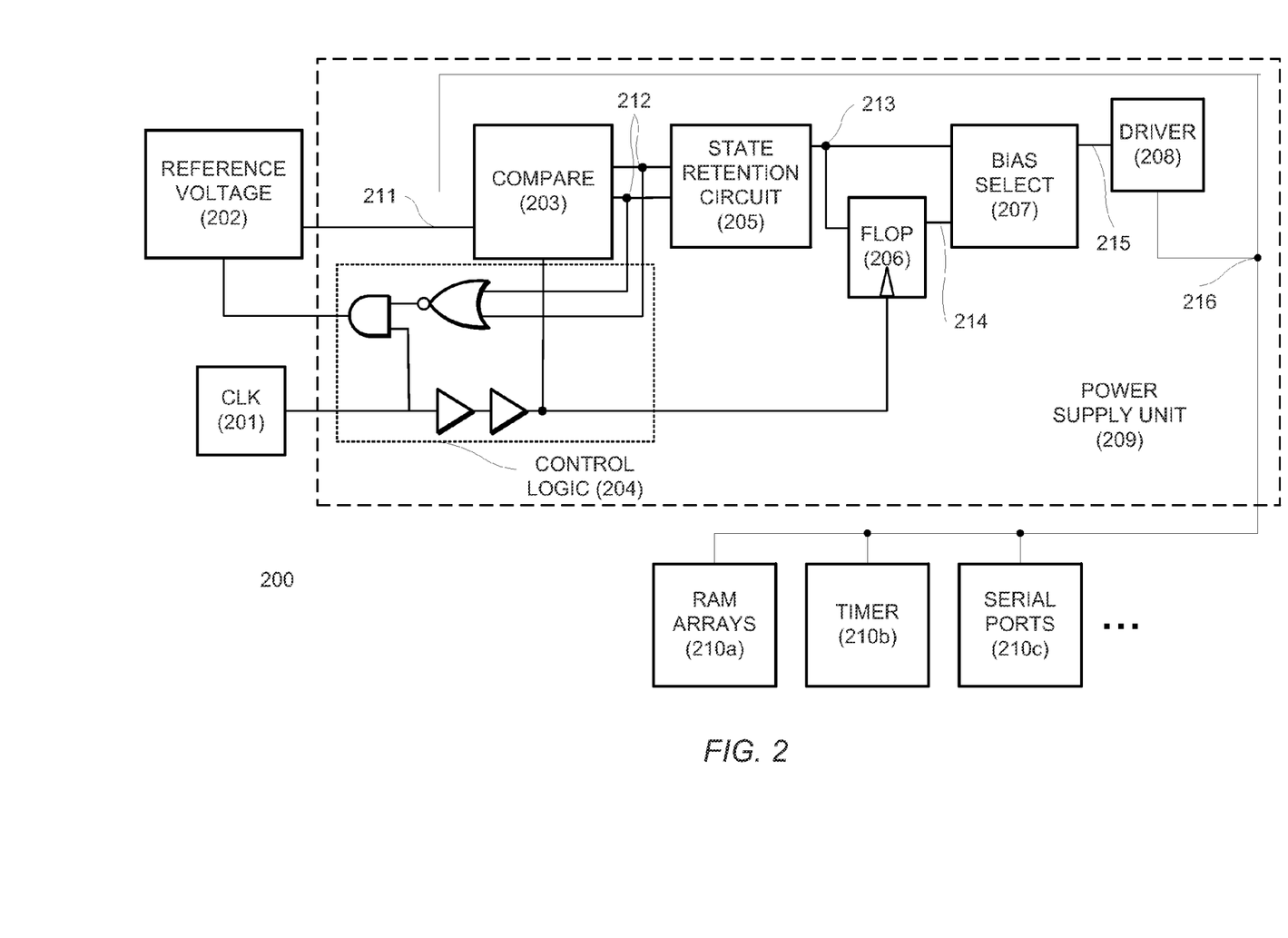
FIG. 2 illustrates an embodiment of a power supply system.

A block diagram of a power supply unit embodiment is illustrated in FIG. 2. In the illustrated embodiment, the system 200 may include a clock circuit (CLK 201), a voltage reference (REFERENCE VOLTAGE CIRCUIT 202), an input comparison circuit (COMPARE 203), a control logic block (CONTROL LOGIC 204), a state retention circuit (STATE RETENTION CIRCUIT 205), a D-type flip-flop, (FLOP 206) a bias voltage selection circuit (BIAS SELECT 207), an output driver (DRIVER 208). Blocks 203 through 208 may combine to form POWER SUPPLY UNIT 209. One or more functional blocks (e.g., RAM ARRAYS 210a, TIMER 210b, SERIAL PORT 210c) may receive the output of DRIVER 208 in some embodiments. In other embodiments, other functional blocks may receive the output from DRIVER 208.

In some embodiments, the output of CLK 201 may be used by POWER SUPPLY UNIT 209 to synchronize the various sub-blocks within POWER SUPPLY UNIT 209. CLK 201 may, in some embodiments, be in another part of system 200 and provide an input signal to the POWER SUPPLY UNIT 209. In other embodiments, CLK 201 may be included within POWER SUPPLY UNIT 209. CLK 201 may output a signal continuously while system 200 is operating. In other embodiments, CLK 201 may enable and disable its output as needed by POWER SUPPLY UNIT 209. In systems where CLK 201 is in another part of system 200, the enabling and disabling of the output of CLK 201 may be used to enable and disable POWER SUPPLY UNIT 209.

REFERENCE VOLTAGE CIRCUIT 202 may, in various embodiments, be configured to produce one or more consistent voltage outputs (signal 211) that may be used as reference voltages by other sub-blocks in POWER SUPPLY UNIT 209. REFERENCE VOLTAGE CIRCUIT 202 may be designed according to one of various design styles, for example a resistor ladder, a bandgap reference, or any other suitable circuit may be employed. In various embodiments, a resistor ladder may be connected between a power supply node and ground. A power supply refers to the main operating voltage for digital logic in the SoC. Ground refers to the common ground voltage for the digital logic. The resistor ladder may have one or more "tap" points wherein the voltage at a given tap is equal to the value of the resistance between the tap and ground divided by the value of the total resistance between the power supply and ground. In some embodiments, the REFERENCE VOLTAGE CIRCUIT 202 may be further configured adjust the total value of the resistance ladder to compensate for fluctuations in the manufacturing process in order to maintain a consistent value from device to device.

When REFERENCE VOLTAGE CIRCUIT 202 is initially enabled, the output may require a brief amount of time to settle to a steady state where the output voltage(s) is ready to be used as a reference. For example, if REFERENCE VOLTAGE CIRCUIT 202 is of a resistor ladder type, then the output when REFERENCE VOLTAGE CIRCUIT 202 is disabled may be equal to the power supply voltage. When REFERENCE VOLTAGE CIRCUIT 202 is enabled in this case, the output will settle to a voltage level less than the power supply voltage. The transition from an output equal to the power supply voltage to the desired reference voltage level will take a finite amount of time. It should be noted, that power supply output levels typically have some amount of fluctuation due to a variety of reasons, such as, for example, switching noise in the system, the design of the power supply itself, and/or ambient electro-magnetic noise in the environment. Therefore, in the following descriptions, when the terms stable or stabilized are used in reference to a voltage, it refers the voltage being in a state steady enough to be used by the system.

COMPARE 203 may, in various embodiments, receive two analog input signals and generate a digital signal whose value is dependent upon the relationship between the two input signals. In the embodiment illustrated in FIG. 2, COMPARE 203 receives a reference voltage (signal 211) from REFERENCE VOLTAGE CIRCUIT 202 and the output (signal 216) of the POWER SUPPLY UNIT 209. Compare 203 may be designed according to one of various design styles. For example, compare 203 may employ a sense amplifier, an analog comparator, or any other suitable circuit for comparing the voltage levels of two or more signals. COMPARE 203 may, in some embodiments, generate two or more signals (signals 212), such as, for example, one signal that is high when the first input is greater than the second and low when the second input is greater than the first, and a second signal that is the opposite of the first signal. In other embodiments, a signal may be generated to indicate that COMPARE 203 has completed a comparison and the output is valid. COMPARE 203 will be discussed in more detail later in the disclosure.

CONTROL LOGIC 204 may be configured to, in some embodiments, to distribute CLK 201 to other sub-blocks within POWER SUPPLY UNIT 209. In other embodiments, CONTROL LOGIC 204 may enable various sub-blocks, such as, for example, REFERENCE VOLTAGE CIRCUIT 202 and COMPARE 203. CONTROL LOGIC 204 may, in some embodiments, enable REFERENCE VOLTAGE CIRCUIT 202 first and then delay to allow REFERENCE VOLTAGE CIRCUIT 202 to stabilize before enabling COMPARE 203 and other sub-blocks.

STATE RETENTION CIRCUIT 205 may, in various embodiments, be configured to receive output signals 212 from COMPARE 203 and maintain the value of the output after COMPARE 203 stops driving. In some embodiments, STATE RETENTION CIRCUIT 205 may retain the output value of COMPARE 203 until the next valid output signals 212 from COMPARE 203 become available. In other embodiments, STATE RETENTION CIRCUIT 205 may output a digital value corresponding to a current state of an output voltage level of POWER SUPPLY UNIT 209 compared to the reference voltage. In some embodiment, the digital value may be a digital word including one or more data bits. The digital word may, in various embodiments, be encoded according to one of a variety of encoding schemes, such as, e.g., binary coded decimal (BCD), for example. Additional details of how STATE RETENTION CIRCUIT 205 operates will be described below in regards to FIG. 4.

FLOP 206 may sample the value of the output of STATE RETENTION CIRCUIT 205 in some embodiments. FLOP 206 may sample this value on a rising clock edge from CLK 201. In some embodiments, FLOP 206 may sample the output of STATE RETENTION CIRCUIT 205 at the same time COMPARE 203 starts a new comparison. In such embodiments, FLOP 206 may consistently hold a previous state of STATE RETENTION CIRCUIT 205 output, while STATE RETENTION CIRCUIT 205 holds a current state. In some embodiments, FLOP 206 may include multiple storage circuits to create a longer history of previous states which may be used by system 200. An alternate embodiment illustrating more previous states will be presented later in the disclosure.

In some embodiments, FLOP 206 may be implemented as a flip-flop. It is noted that flip-flops may be particular embodiments of single data bit storage circuit and may be designed in accordance with one of various design styles. For example, latches and flip-flops may be implemented using either dynamic or static circuits, or a combination thereof. In some embodiments, each storage circuit may include scan cells as part of the implementation of a boundary scan test circuit.

BIAS SELECT 207 may receive both the current state from STATE RETENTION CIRCUIT 205 and the previous state from FLOP 206. In the example embodiment of FIG. 2, BIAS SELECT 207 selects a voltage to output based on the current and previous states. In other embodiments, BIAS SELECT 207 may receive additional previous states such that more bias voltage options may be selected as the output. BIAS SELECT 207 will be discussed in further detail later in the disclosure.

In some embodiments, DRIVER 208 may be implemented as one or more transconductance devices, such as, e.g., a Junction Field-Effect Transistor (JFET), MOSFET, or Bipolar Junction Transistor (BJT). The transconductance device(s) may couple driver output 216 to the voltage supply, such that the transconductance device may act as a pull-up device. The strength of the pull-up on driver output 216 is higher or lower based on the input voltage to DRIVER 208. In various other embodiments, a transconductance amplifier may be used. In the embodiment illustrated in FIG. 2, output signal 215 from BIAS SELECT 207 provides the input to transconductance FET such that DRIVER 208 output is pulled harder to the voltage supply when bias select output 215 is a lower voltage.

In the example embodiment, RAM ARRAYS 210a, TIMER 210b, and SERIAL PORTS 210c are the recipients of output 216 from DRIVER 208. These peripherals 210a-210c may enter a low power or background state before receiving the output of POWER SUPPLY UNIT 209. In other embodiments, various other SoC peripherals may be used, such as, for example, SoC registers, data buffers, etc.

It is noted that the system illustrated in FIG. 2 is merely an example. In other embodiments, different functional blocks and different configurations of functions blocks are possible dependent upon the specific application for which the system is intended.

Figure 3:
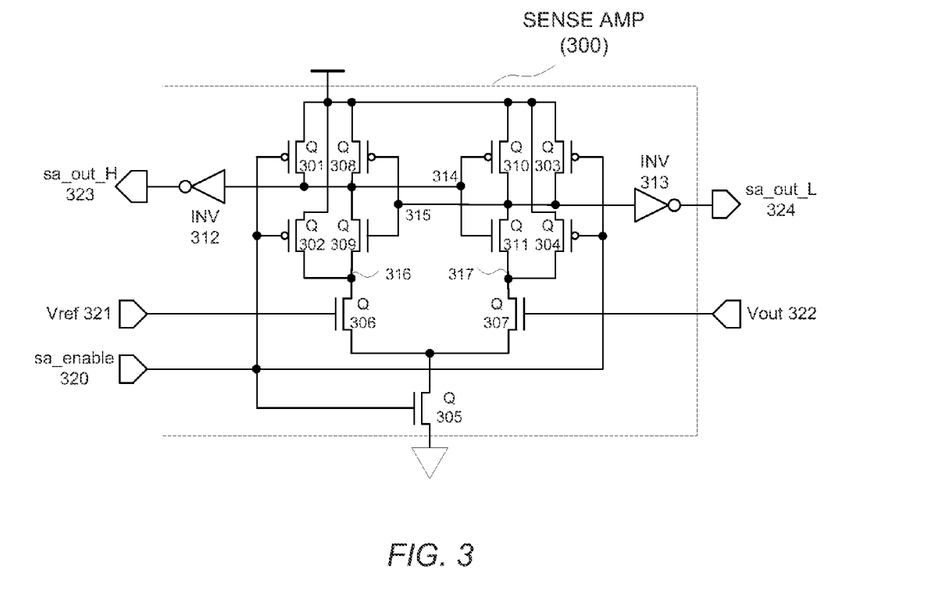
FIG. 3 illustrates an embodiment of a sense amplifier circuit.

Turning to FIG. 3, an embodiment of a sense amplifier is illustrated. In some embodiments, SENSE AMP 300, may correspond to COMPARE 203 as illustrated in FIG. 2. SENSE AMP 300 may receive signals sa_enable 320, Vref 321, and Vout 322 as inputs from other parts of the system. For instance, Vref 321 may correspond to signal 211 from FIG. 2 and Vout 322 may correspond to output 216 from FIG. 2. Vref 321 and Vout 322 are coupled to transistors Q306 and Q307, respectively. Signal sa_enable 320 may correspond to a delayed version of the output of CLK 201 from FIG. 2. Sa_enable 320 is coupled to transistors Q301-Q305. SENSE AMP 300 may have two outputs, sa_out_H 323 and sa_out_L 324 which may correspond to signals 212 as shown in FIG. 2. Sa_out_H 323 and sa_out_L 324 are coupled to the outputs of inverters INV 312 and 313, respectively. Although inverters are illustrated, INV 312 and INV 313 may be embodiments of various circuits that may buffer and/or invert the coupled input signals, node 314 and node 315.

During operation SENSE AMP 300 is enabled and disabled by the input signal sa_enable 320 which controls transistors Q301-Q305. SENSE AMP 300 may be disabled when sa_enable 320 is low. In this state, Q301-Q304 will conduct, thereby pre-charging nodes 314 and 315 to the power supply voltage. Nodes 314 and 315 are the input to inverters INV 312 and INV 313, which drive outputs sa_out_H 323 and sa_out_L 324 both to low states, respectively. Nodes 316 and 317 are also pre-charged to the power supply voltage. Q305 will not conduct with a low input from sa_enable 320, so the path to ground is disabled, regardless of the Vout 322 and Vref 321 inputs on Q306 and Q307 respectively.

It is noted that although pre-charge devices, feedback devices, pull-up devices, and pull-down devices may be illustrated as individual transistors, in other embodiments, any of these devices may be implemented using multiple transistors or other suitable circuit elements.

In response to sa_enable 320 transitioning to a high state, Q301-Q304 stop conducting and Q305 starts conducting, thereby opening a path to ground. Now the comparison of Vout 322 to Vref 321 begins. If Vout 322<Vref 321, then node 316 will be pulled to ground faster than node 317, which results in Q309 conducting before Q311. This in turn pulls node 314 to ground which causes Q310 to conduct and Q311 to not conduct which keeps node 315 pulled to the power supply voltage. The sense amp will stabilize with sa_out_H 323 transitioning to a high state and sa_out_L 324 remaining in a low state. If Vout 322>Vref 321, the opposite will occur and sa_out_H 323 will remain in a low state and sa_out_L 324 will transition to a high state.

It is noted that static CMOS inverters, such as those shown and described herein, may be a particular embodiment of an inverting amplifier that may be employed in the circuits described herein. However, in other embodiments, any suitable configuration of inverting amplifier that is capable of inverting the logical sense of a signal may be used, including inverting amplifiers built using technology other than CMOS.

FIG. 3 is merely an example of a comparison circuit. In other embodiments, various other sense amps circuits may be employed. Still other embodiments may implement comparison circuits based on differential amplifier circuit techniques.

Figure 4:
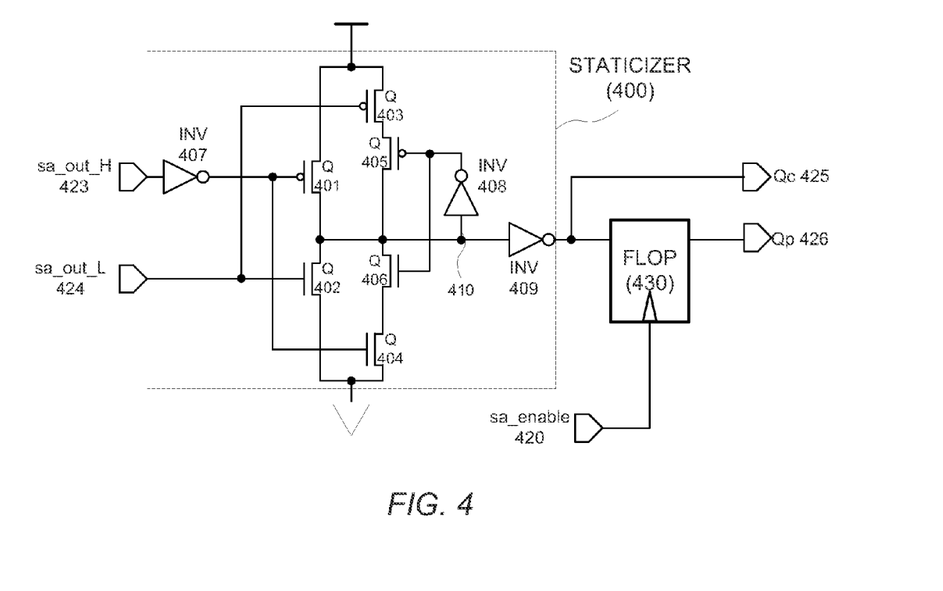
FIG. 4 illustrates an embodiment of a staticizer circuit.

FIG. 4 illustrates an embodiment of a state retention circuit, STATICIZER 400. In some embodiments, STATICIZER 400 may correspond to STATE RETENTION CIRCUIT 205, although other possible embodiments are known. In this illustrated embodiment, sa_out_H 423 and sa_out_L 424 may be inputs coming from a comparison circuit, such as, e.g., sa_out_H 323 and sa_out_L 324 from SENSE AMP 300 as illustrated in FIG. 3. Sa_out_H 423 is coupled to the input of INV 407. Sa_out_L 424 is coupled to transistors Q402 and Q403. STATICIZER 400 outputs a signal Qc 425 which is coupled to the output of INV 409.

During operation, note that if SENSE AMP 300 is enabled and its outputs are stable, sa_out_H 423 and sa_out_L 424 may be at complementary states, in other words, if sa_out_H 423 is high then sa_out_L 424 may be low and vice versa. When sa_out_H 423 is low and sa_out_L 424 is high, inverter INV 407 outputs a high state which results in p-channel transistor Q401 not conducting. N-channel transistor Q402 will conduct due to the high state from sa_out_L 424. Q403 will not conduct and Q404 will conduct. This results in node 410 being pulled to a low state. Both INV 408 and INV 409 will output high states. The high state output by INV 408 causes Q405 to not conduct and Q406 to conduct. Since both Q404 and Q406 are conducting, node 410 is pulled strongly to a low state. The output Qc 425 will therefore be in a high state.

When the comparison circuit is disabled, sa_out_H 423 and sa_out_L 424 may both transition to low states after a short delay while the comparison circuit stabilizes. This may cause both Q401 and Q402 to not conduct, and place Q403 and Q404 in a conductive state. Since node 410 has already stabilized at a low state, Q405 is not conducting and Q406 is conducting. Therefore, node 410 may remain in a low state and output Qc 425 remains in a high state.

Also illustrated in FIG. 4 is FLOP 430, which, in some embodiments, may correspond to FLOP 206 in FIG. 2. FLOP 430 is coupled to Qc 425 such as to receive Qc 425 as an input. FLOP 430 is also coupled to sa_enable 420, such as to receive sa_enable as a clock source. The output of FLOP 430 is Qp 426.

During operation, sa_enable 420 may transition to a high state to start another comparison of Vout 322 to Vref 321 in SENSE AMP 300, this may cause FLOP 206 to capture the current state of Qc 425, which, in our current example, is a high state, as delays in the stabilization of outputs from SENSE AMP 300 will delay the update of Qc 425. The output of FLOP 430, Qp 426, may then be in a high state. After a short delay, determined by the technology and design of the transistors used to create the circuits, Qc 425 will transition to its new value based on the latest SENSE AMP 300 output. Since FLOP 430 captured the state of Qc 425 before it updated, Qp 426 now holds the previous state of Qc 425.

The embodiment illustrated in FIG. 4 is merely an example. It is noted that various other embodiments of staticizer circuits are possible and contemplated. In other embodiments, a latch or flip-flop may be used as STATE RETENTION CIRCUIT 205.

Figure 5:
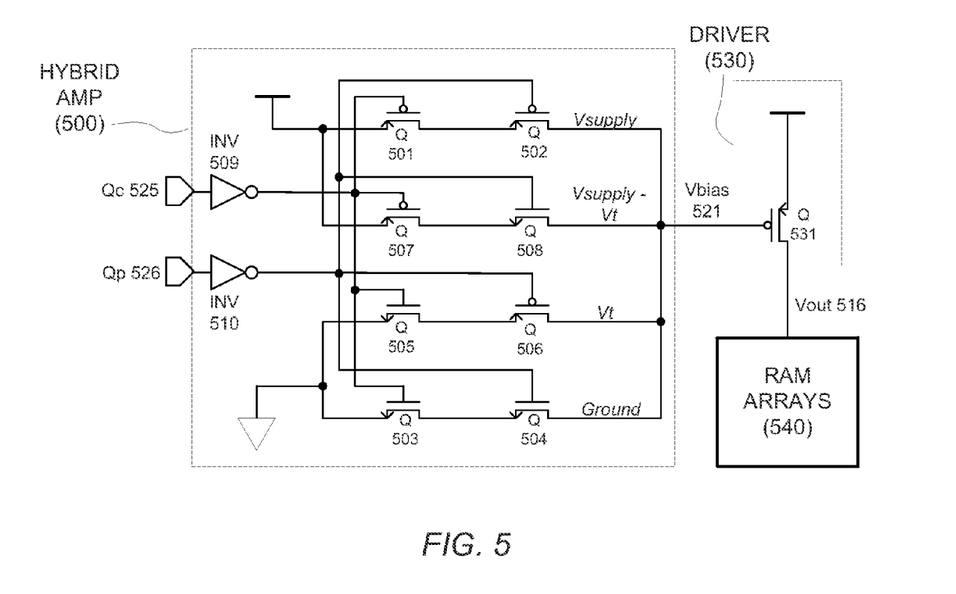
FIG. 5 illustrates an embodiment of a bias voltage selector.

FIG. 5 illustrates an example embodiment of a digital hybrid amplifier, HYBRID AMP 500. In some embodiments, HYBRID AMP 500 may correspond to BIAS SELECT 207 from FIG. 2, although other possible embodiments are known. HYBRID AMP 500 may receive signals Qc 525 and Qp 526 which may correspond to Qc 425 and Qp 426 from STATICIZER 400 from FIG. 4. Qc 525 is coupled to the input of inverter INV 509 and Qp 526 is coupled to the input of inverter INV 510. HYBRID AMP 500 has an output Vbias 521, which is coupled to transistors Q502, Q504, Q506, and Q508.

In this illustrated embodiment, Qc 525, representing the current state of Vout 522 (high state if Vout 522 is greater than Vref 321, low state if Vout 522 is less than Vref 321) and Qp 526, representing a previous state of Vout 522, are the input signals to HYBRID AMP 500. Qc 525 and Qp 526 may be inverted by inverters INV 509 and INV 510. Inverted Qc 525 is coupled to the gates of transistors Q501, Q503, Q505 and Q507. Inverted Qp 526 is coupled to the gates of transistors Q502, Q504, Q506 and Q508.

In the present example, transistors Q501, Q502, Q506 and Q507 are p-channel, so they conduct in response to a low state on their gates. Transistors Q503, Q504, Q505 and Q508 are n-channel, so they conduct in response to a high state on their gates. When a signal equal to the power supply voltage passes through a p-channel transistor, the signal is not attenuated. When the same signal passes through an n-channel transistor, the signal is attenuated by a voltage equal to the threshold voltage (also referred to herein as "Vt") of the n-channel transistor. This value is determined by the technology and design of the transistor. The opposite is true for a signal equal to ground. In this case, the signal would not be attenuated passing through an n-channel transistor and would be attenuated by a voltage equal to Vt when passing through a p-channel transistor. Table 1 shows the resulting bias voltage, Vbias, as a result of the four combinations of states of signals Qc and Qp. The term Vpower_supply in Table 1 refers to the power supply voltage.

TABLE 1

| Bias Voltage Selection | | |
| --- | --- | --- |
| Qc | Qp | Vbias |
| low | low | ground |
| low | high | Vt |
| high | low | Vpower_supply-Vt |
| high | high | Vpower_supply |

The resulting Vbias 521 may be coupled to the gate of a transconductance FET to implement DRIVER 530. In some embodiments, DRIVER 530 may correspond to DRIVER 208 illustrated in FIG. 2. The output of DRIVER 530 may be Vout 516, which may correspond to output 216 from FIG. 2.

Transconductance refers to how well a transistor conducts current when a given voltage is applied to its gate. In CMOS logic circuits, the MOSFETs are typically designed to operate in one of two modes, "on" with maximum conductance and "off" with minimum conductance. In some embodiments, to create voltage levels between the power supply voltage and ground, a transistor may be operated such that its transconductance responds proportionately to the voltage level applied to its gate. In this example, since a p-channel FET is used, the lower the Vbias 521 voltage is, stronger Vout 516 will be pulled to the power supply voltage. In some embodiments, the relationship between the gate voltage and the transconductance may be approximately linear, while, in other embodiments, the gate voltage and the transconductance may have a different relationship.

FIG. 5 is merely one example of bias selection and output driver circuits. In other embodiments, various adjustable amplification circuits may be used, such as digital-to-analog converters (DACs). Still other embodiments may implement other state-controlled power supplies.

Figure 6:
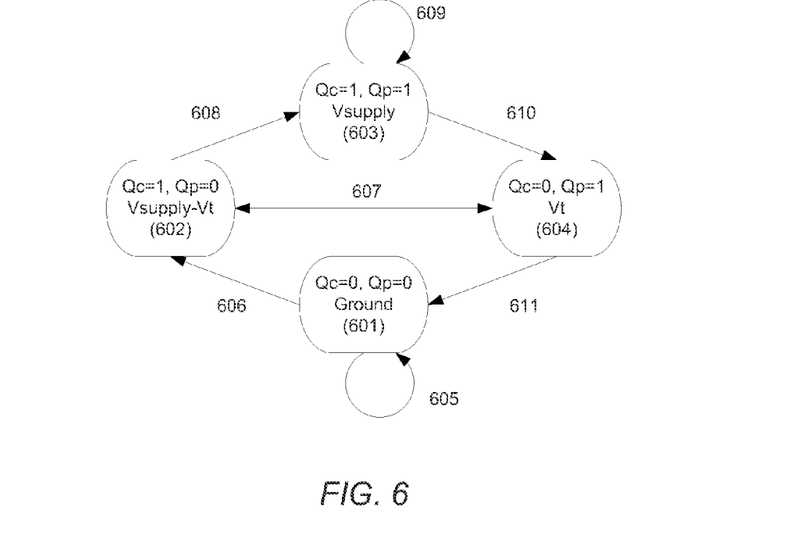
FIG. 6 illustrates a state diagram of an embodiment of a power supply system.

FIG. 6 illustrates an embodiment of a state diagram for a power supply system such as described in FIGS. 1-4. In this example embodiment, operation of the regulator is simplified to four states, 601-604, as determined by the current state, Qc and the previous state, Qp. In state 601, Vout is below Vref and was also below Vref during the previous comparison. This may be the state when the voltage regulator system 200 is initially powered on. In state 601, DRIVER 208 may pull Vout hard to the power supply voltage to quickly move Vout to be greater than Vref. There may be two transitions while in this state, transitions 605 and 606. If Vout remains below Vref during the next comparison, then transition 605 may occur, in which case, system 200 may remain in state 601. If Vout is greater than Vref during the next comparison, then transition 606 may occur and system 200 may transition into state 602.

In state 602, Vout has increased from being less than Vref in the previous comparison to being greater than Vref in the current comparison. In state 602, DRIVER 208 may pull Vout to the power supply voltage with a weak pull up to avoid overshooting the Vref target voltage. Two transitions may be available to leave state 602, transitions 607 and 608. Transition 607 may be taken if Vout is less than Vref at the next comparison, transitioning system 200 to state 604. Otherwise, if Vout remains greater than Vref, transition 608 may transition system 200 to state 603.

In state 603, Vout is greater than Vref and was also greater than Vref in the previous comparison. In state 603, DRIVER 208 may stop pulling Vout to the power supply voltage to allow Vout to droop down below Vref, thereby keeping the voltage centered around the Vref target level. Two transitions may be available from state 603, transitions 609 and 610. Transition 609 may be taken if Vout remains greater than Vref, which keeps system 200 in state 603. If Vout falls below Vref, then transition 610 may be taken and system 200 moves to state 604.

In state 604, Vout has fallen from being higher than Vref in the previous comparison to lower than Vref in the current comparison. In state 604, DRIVER 208 may pull Vout to the power supply voltage harder than in state 602, but not as hard as in state 601, with a goal of raising Vout above Vref without overshooting the Vref target level. Two transitions may be available from state 604, transitions 607 and 611. Transition 607 may be taken if Vout increases to greater than Vref in the next comparison, moving system 200 into state 602. Otherwise, transition 611 may take system 200 to state 601.

It is noted that FIG. 6 is merely an example of a state diagram for a power supply system such as POWER SUPPLY UNIT 209. The number of states and the transitions between states may differ in other embodiments based on the application for which the power supply is intended.

Power Management Methods

Figure 7:
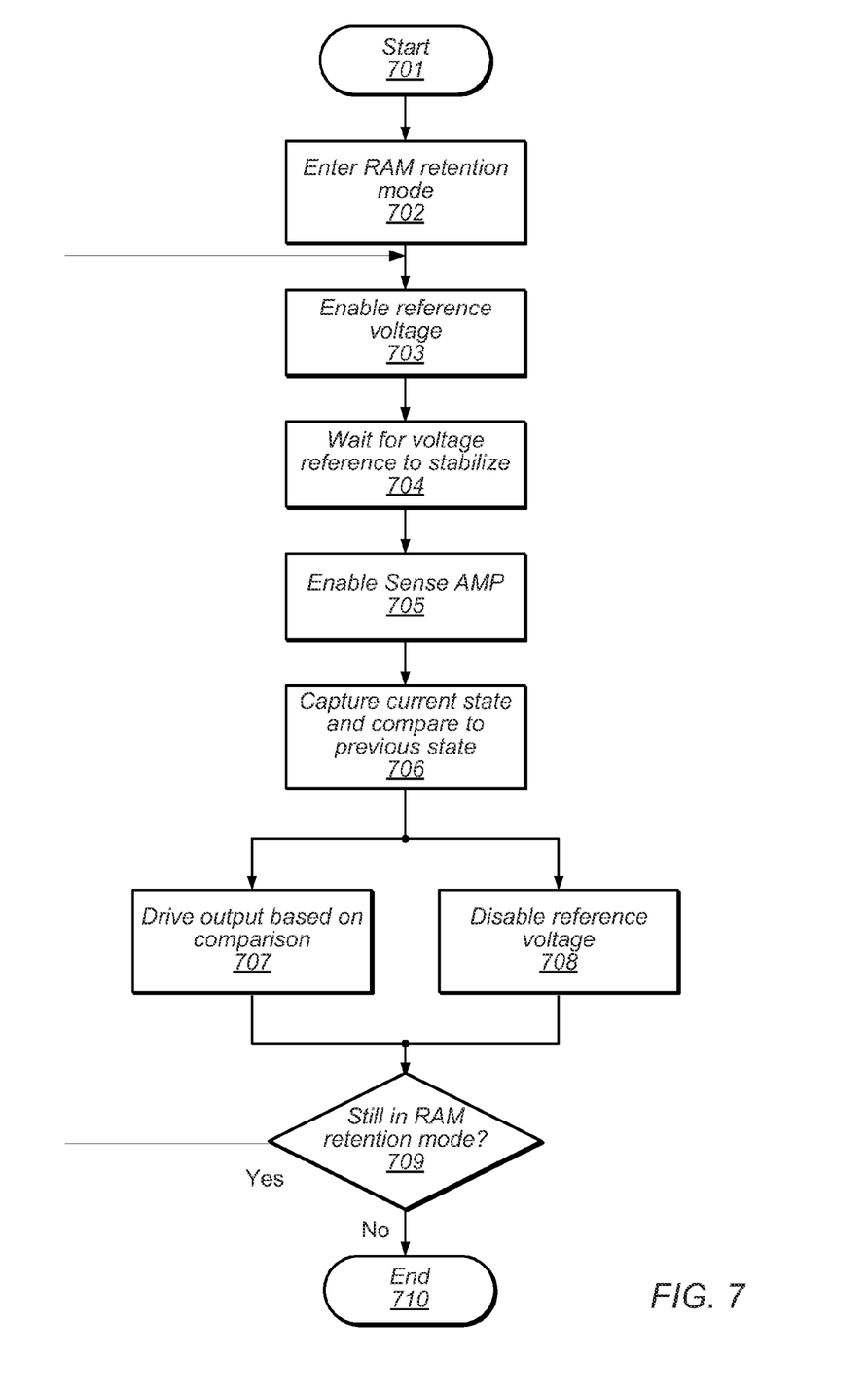
FIG. 7 illustrates a flowchart of an embodiment of a method.

FIG. 7 illustrates a flowchart depicting an embodiment of a method for managing the output of a power supply circuit, such as, e.g., POWER SUPPLY UNIT 209 illustrated in FIG. 2. Referring collectively to POWER SUPPLY UNIT 209 and the flowchart in FIG. 7, the method may begin in block 701. RAM ARRAYS 210a may enter a retention mode (block 702). In response to RAM ARRAYS 210a entering a retention mode, CLK 201 may begin to toggle. In other embodiments, a control signal may be asserted that signals a RAM is entering a retention mode.

In response to RAM ARRAYS 210a entering a retention mode, POWER SUPPLY UNIT 209 may be enabled. POWER SUPPLY UNIT 209 may be enabled by CLK 201 transitioning from a static state to a toggling state. In other embodiments, POWER SUPPLY UNIT 209 may be enabled by the control signal that signaled the RAM retention mode. In response to receiving a rising clock edge from CLK 201, CONTROL LOGIC 204 may enable REFERENCE VOLTAGE CIRCUIT 202 (block 703). In other embodiments, a falling edge of CLK 201 may trigger CONTROL LOGIC 204 to enable REFERENCE VOLTAGE CIRCUIT 202.

CONTROL LOGIC 204 may wait for a period of time to allow REFERENCE VOLTAGE CIRCUIT 202 to stabilize (block 704). This period of time may be set by propagation delays through one or more logic gates. In other embodiments, the period of time may be determined by monitoring the REFERENCE VOLTAGE CIRCUIT 202 output to sense when it is stable.

Once the period of time has elapsed, CONTROL LOGIC 204 may assert a signal to COMPARE 203 to begin comparing the output of REFERENCE VOLTAGE CIRCUIT 202, Vref, to the regulator output of system 200, Vout (block 705). Upon completion of the comparison of Vref to Vout, COMPARE 203 may output two signals, one, sa_out_H and sa_out_L, as described above in respect to FIG. 3. In some embodiments, these signals may be complementary upon COMPARE 203 being enabled and a comparison being complete.

STATE RETENTION CIRCUIT 205 may capture the output from COMPARE 203 and FLOP 206 may hold the previous output from COMPARE 203 as described above in respect to FIG. 4. STATE RETENTION CIRCUIT 205 may receive sa_out_H to capture and use as a current state. In alternate embodiments, STATE RETENTION CIRCUIT 205 may receive sa_out_L to capture and use as a current state. BIAS SELECT 207 may receive the value of the current state, Qc, from STATE RETENTION CIRCUIT 205 and may receive the value of the previous state, Qp, from FLOP 206. BIAS SELECT 207 may compare Qc to Qp (block 706).

Based on the values of Qc and Qp, BIAS SELECT 207 output a specific voltage, Vbias (block 707). DRIVER 208 may receive Vbias and DRIVER 208 may adjust its output based on the level of Vbias (block 707). In some embodiments, DRIVER 208 may be a MOSFET transistor, configured as described above in respect to FIG. 5, which may be used to pull Vout up to a power supply. In other embodiments, BIAS SELECT 207 and DRIVER 208 may be a single block which may directly output Vout. More details on BIAS SELECT 207 will be provided below.

The complementary state of the output of COMPARE 203 described above may be used by CONTROL LOGIC 204 to disable REFERENCE VOLTAGE CIRCUIT 202 (block 708). In other embodiments, COMPARE 203 may assert a signal to signify a completed comparison which CONTROL LOGIC 204 may use to disable REFERENCE VOLTAGE CIRCUIT 202.

POWER SUPPLY UNIT 209 may determine if the RAM retention mode is still active (block 709). In some embodiments, this may be determined by receiving another rising or falling edge from CLK 201. In other embodiments, RAM retention mode may be sensed as being active by the continued assertion of a control signal. If the RAM retention mode is determined to still be active, then the method may return to block 703. Otherwise, the method may end in block 710. In other embodiments, the method may wait for a start signal before starting another comparison cycle at block 703.

It is noted that the method illustrated in FIG. 7 depicts operations being performed in a sequential fashion with block 707 and block 708 being performed in parallel. In various other embodiments, other operations may be performed in parallel or in a different sequence. Block 707 and block 708 may be performed in series in other embodiments.

Figure 8:
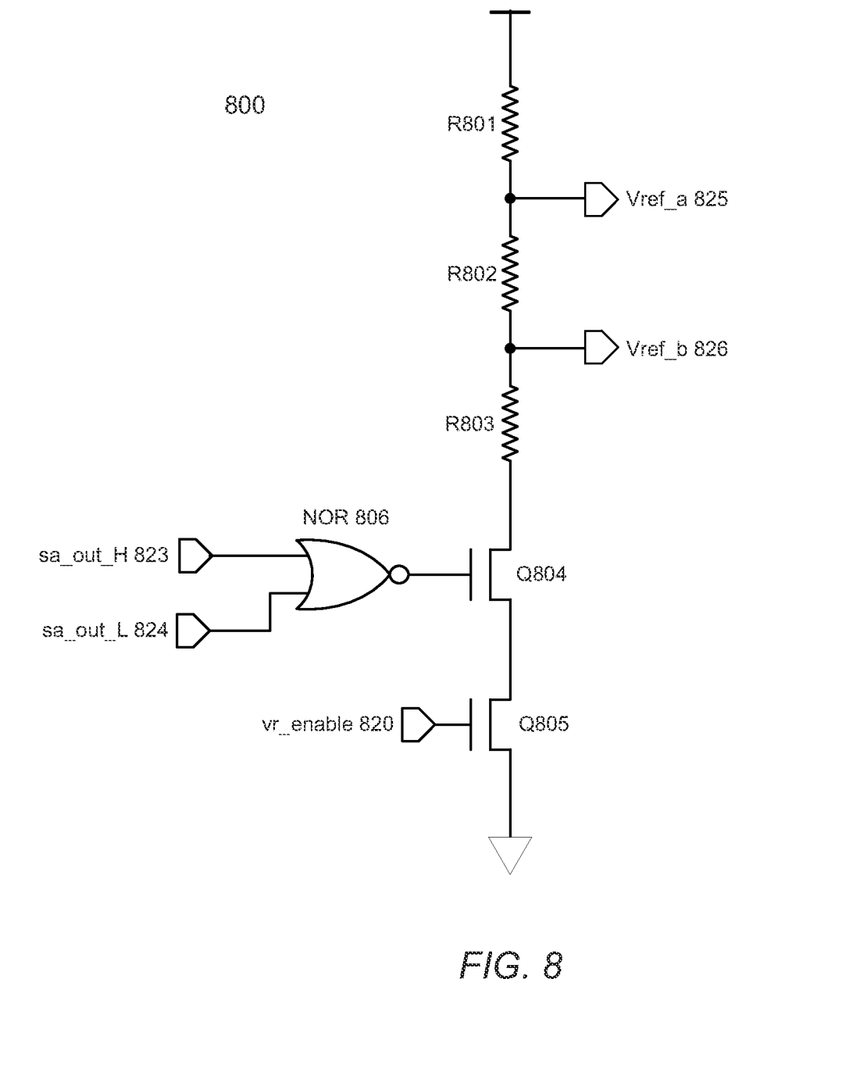
FIG. 8 illustrates an embodiment of a voltage reference circuit.

Turning to FIG. 8, an example embodiment of a voltage regulator circuit is illustrated. In some embodiments, voltage regulator circuit 800 might be used for REFERENCE VOLTAGE CIRCUIT 202 in System 200 as illustrated in FIG. 2, although various other embodiments are also possible. In some embodiments, voltage regulator circuit 800 may receive inputs sa_out_H 823 and sa_out_L 824 as outputs from a sense amplifier, such as, e.g., SENSE AMP 300 from FIG. 3. Sa_out_H 823 and sa_out_L 824 may correspond to sa_out_H 323 and sa_out_L 324 from FIG. 2. In some embodiments, voltage regulator circuit 800 may also receive input vr_enable 820, which may come from a clock source such as, e.g., CLK 201 from FIG. 2. In alternate embodiments, vr_enable may come from a processor within an SoC, such as, e.g., PROCESSOR 101 in FIG. 1.

In this illustrated embodiment, a resistor ladder is formed by resistors R801-R803. Various voltage levels can be output based on where on the resistor ladder a tap point is made. In this illustrated embodiment, two reference voltages may be output, Vref_a 825 and Vref_b 826. Vref_a 825 is taken from the node between R801 and R802. Vref_b 826 is taken from the node between R802 and R803. Voltage regulator circuit 800 may be enabled when the two transistors, Q804 and Q805 are both conducting. Q804 may conduct when the NOR logic gate, NOR 806, is high, which may occur when input signals sa_out_H 823 and sa_out_L 824 are both low. Q805 will conduct when input signal vr_enable 820 is high. Therefore, the inputs must be vr_enable 820 set high, sa_out_H 823 set low and sa_out_L 824 set low. Any other combination and the voltage regulator circuit 800 is disabled.

It is noted that in some embodiments, resistors R801 through R803 may reside on an SoC circuit, such as, e.g., SOC 100 illustrated in FIG. 1, and may be constructed from polycrystalline silicon, n-type or p-type diffused silicon, copper or aluminum metal, or any other suitable material available on a semiconductor manufacturing process. In other embodiments, resistors R801 through R803 may reside outside of an SoC circuit such as, e.g., SOC 100 illustrated in FIG. 1 and coupled to the circuit through a circuit board or equivalent medium. In various embodiments, resistors R801 through R803 may be active resistors, i.e., transistors biased to provide a fixed impedance or resistor.

When voltage regulator circuit 800 is disabled, no current may flow through R801-R803. Therefore, Vref_a 825 and Vref_b 826 will rise to a voltage level equivalent to the power supply voltage. When voltage regulator circuit 700 is enabled, current will flow from the power supply to ground through resistors R801-R803 and through Q804 and Q805. In this case, Vref_a 825 will be at a voltage level determined by equation 1 and Vref_b 826 will be at a voltage level determined by equation 2.

$$Vref_a = VDD * \frac{R802 + R803}{R801 + R802 + R803} \quad (1)$$

$$Vref_b = VDD * \frac{R803}{R801 + R802 + R803} \quad (2)$$

It is noted that the embodiment illustrated in FIG. 8 is merely an example. In other embodiments, different numbers of resistors and different types of resistors are possible and contemplated. It is also noted that transistors Q804 and Q805 could be p-channel and connected between resistors R801-R803 and the power supply. NOR 806 may implemented by various other means that provide similar functionality.

Figure 9:
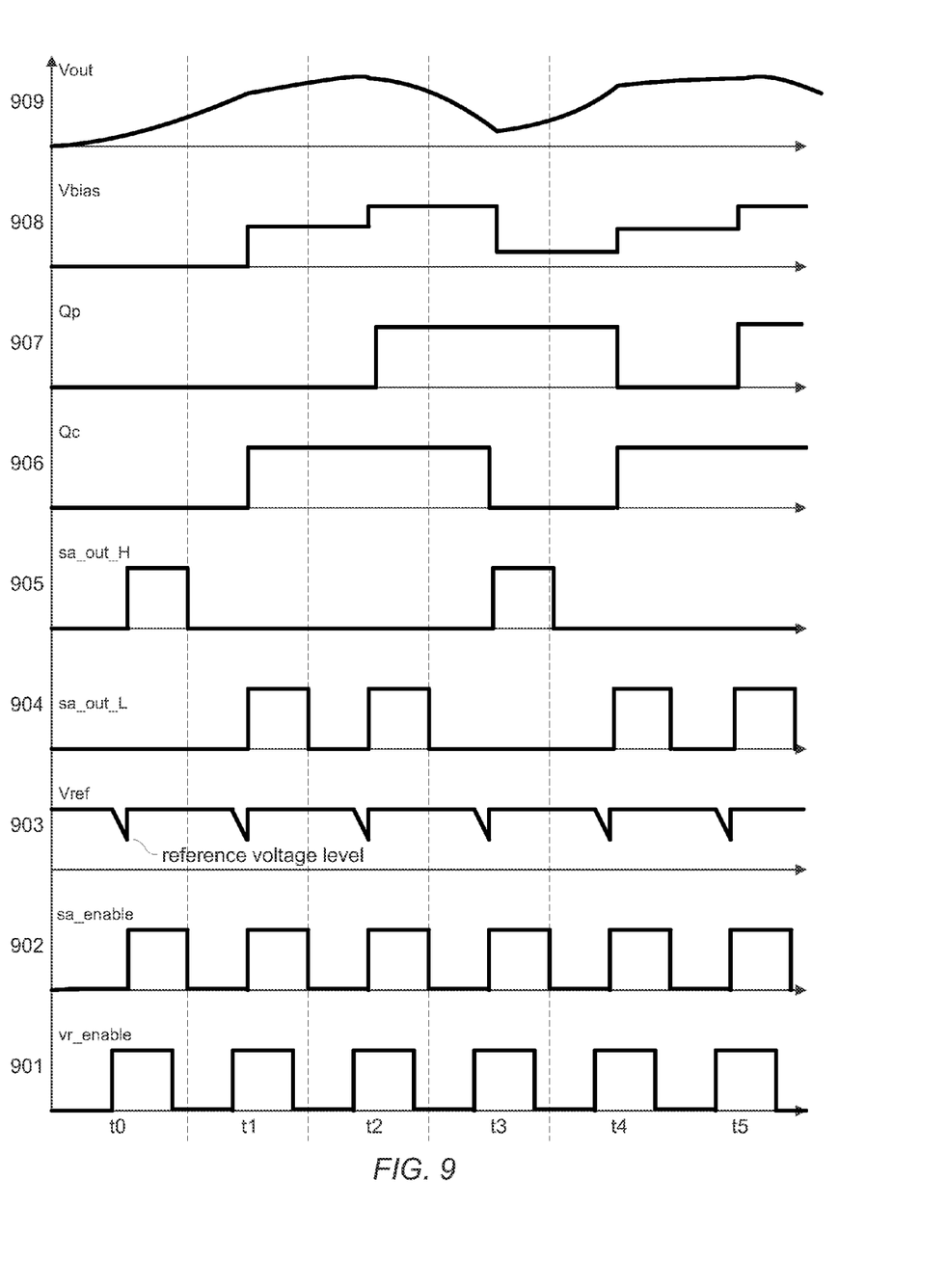
FIG. 9 illustrates example waveforms associated with the operation of an embodiment of a power supply system.

FIG. 9 illustrates a chart of possible waveforms associated with a power supply management unit such as POWER SUPPLY UNIT 209. Referring collectively to POWER SUPPLY UNIT 209 and the chart in FIG. 7, the first waveform on the bottom of the chart, 901, shows a clock signal such as may be provided by CLK 201, called vr_enable. Waveform 902 displays a delayed version of waveform 901, referred to as sa_enable. Waveform 903, Vref, shows an example of a possible output of REFERENCE VOLTAGE CIRCUIT 202. Waveform 904, sa_out_L, and waveform 905, sa_out_H, show example outputs of COMPARE 203. Waveform 906, Qc, is an example output of STATE RETENTION CIRCUIT 205 and waveform 907, Qp, is an example of the output of FLOP 206. Waveform 908, Vbias, shows an example output of BIAS SELECT 207. Waveform 909, Vout, is an example of the output of DRIVER 208.

Turning back to illustrated waveform 901, this signal may be an input into POWER SUPPLY UNIT 209. In the example embodiment of system 200, as described above, vr_enable may be an input into CONTROL LOGIC 204. If vr_enable is high and sa_out_L and sa_out_H are low, then REFERENCE VOLTAGE CIRCUIT 202 may be enabled and the output, Vref, may drop down to its enabled reference voltage level.

CONTROL LOGIC 204 may also delay vr_enable to create sa_enable. The sa_enable signal may go to COMPARE 203 and FLOP 206, which may cause COMPARE 203 to begin a comparison. FLOP 206 may also store the current state of Qc as Qp. In time period t0 in FIG. 9, both Qc and Qp enter the period low, therefore Qp remains low at the rising edge of sa_enable.

In response to the rising edge on sa_enable, COMPARE 203 may generate a comparison of Vref to Vout. In period t0, Vout is lower than Vref, so sa_out_H is set high and sa_out_L remains low. Note that when sa_out_H goes high, Vref rises back to its disabled value. As described above in reference to the example circuit for REFERENCE VOLTAGE CIRCUIT 202 in FIG. 8, both sa_out_L and sa_out_H must be low for REFERENCE VOLTAGE CIRCUIT 202 to be enabled. Therefore, when COMPARE 203 generates an output in which either sa_out_L or sa_out_H goes high, REFERENCE VOLTAGE CIRCUIT 202 may be disabled automatically.

BIAS SELECT 207 may compare the values of Qc and Qp. In period t0, both Qc and Qp are low, so, based on the example circuit of FIG. 5, Vbias will be ground. As previously described in reference to FIG. 5, the lower the value of Vbias, the stronger Vout is pulled to the power supply voltage. Therefore, with Qc and Qp both low, Vbias is set to its lowest level, i.e., GROUND, and Vout is pulled strong to the power supply voltage and will therefore begin rising.

It is noted that on the falling edge of sa_enable in t0, sa_out_H goes back low, making both sa_out_L and saout_H low, which may allow REFERENCE VOLTAGE CIRCUIT 202 to be enabled again. However, vr_enable has also transitioned low, so REFERENCE VOLTAGE CIRCUIT 202 will not be enabled again until the next rising edge of vr_enable.

In the next time period, t1, another comparison may be triggered by the rising edge of sa_enable. In t1, Vout has risen above Vref. In response, COMPARE 203 may set sa_out_L high. STATE RETENTION CIRCUIT 205 may set the value of Qc high in response to sa_out_L transitioning high. FLOP 206 may store the value of Qc just before Qc transitions high, such that Qp remains low in t1. BIAS SELECT 207 may change the Vbias output in response to Qc being high and Qp remaining low. The new value for Vbias, referring to Table 1, is Vpower_supply-Vt. Now DRIVER 208 may have a weak pull on Vout to the power supply voltage, which may cause the voltage level of Vout to not rise as steeply, but it may still rise.

The cycle may repeat in time period t2. In t2, Vout is still higher than Vref, so sa_out_L is again set high. STATE RETENTION CIRCUIT 205 may keep Qc high. However, now FLOP 206 may set Qp as high instead of low. As a result, BIAS SELECT 207 may choose a new Vbias in response to Qc and Qp both being high. From Table 1, the new Vbias level may be the power supply voltage. Now DRIVER 208 may have no pull on Vout to the power supply voltage, which may result in the voltage level of Vout to begin falling.

The next cycle, t3, may see Vout fall below Vref. So in t3, COMPARE 203 may set sa_out_H to high. STATE RETENTION CIRCUIT 205 may set Qc to low. FLOP 206 may store the value of Qc before it transitions low, such that Qp may remain high. In response to Qc set low and Qp set high, BIAS SELECT 207 may set Vbias to Vt, according to Table 1. Applying Vt to DRIVER 208 may result in Vout being pulled to the power supply voltage with a mid-range strength, i.e., a stronger pull than when Vbias is Vpower_supply-Vt, but not as strong as when Vbias is GROUND.

In the next cycle, t4, we may see Vout again rise above Vref. As a result, we may see COMPARE 203 set sa_out_L high, which may result in STATE RETENTION CIRCUIT 205 setting Qc to high. FLOP 206 may store the value of Qc before it transitions high, such that Qp is set low. With Qc set high and Qp set low, BIAS SELECT 207 may set Vbias to Vpower_supply-Vt, which may result in DRIVER 208 having a weak pull on Vout to the power supply voltage.

In the last example cycle, t5, Vout may remain above Vref, which may result in COMPARE 203 setting sa_out_L to high. STATE RETENTION CIRCUIT 205 may set Qc to high. FLOP 206 may store the previous value of Qc, which was also high, setting Qp to high. In response to QC and Qp both being high, BIAS SELECT 207 may set Vbias to the power supply voltage. The power supply voltage applied to DRIVER 208 may result in no pull of Vout to the power supply voltage, which may result in Vout to begin falling.

From the description above and waveform 909 in FIG. 9, it should be easy to see that the output of POWER SUPPLY UNIT 209 may not be a single consistent voltage level. Instead, Vout may undulate above and below Vref, with the average voltage level being close to Vref. This undulation is commonly referred to as voltage ripple. To reduce the size of the ripple, i.e., reduce the voltage delta between the minimum and maximum voltage levels of the ripple, more than one previous state may be saved and used by BIAS SELECT to set Vbias.

FIG. 9 is merely an example of waveforms that may result from the example embodiments as presented in this disclosure. Use of alternate embodiments may result in variations to the waveforms presented in FIG. 9.

Figure 10:
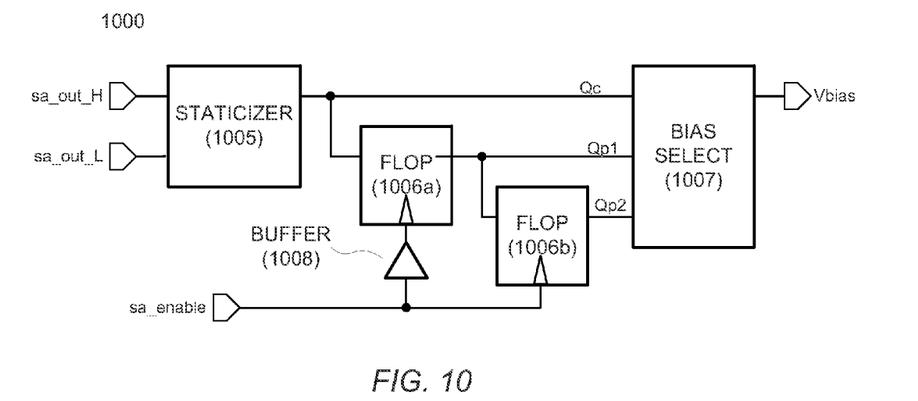
FIG. 10 illustrates an alternate embodiment of a power supply system.

FIG. 10 illustrates an example embodiment of a portion of POWER SUPPLY UNIT 1000. In some embodiments, Staticizer 1005 may correspond to STATE RETENTION CIRCUIT 205 as illustrated in FIG. 2, and may provide a similar output, Qc, corresponding to the current state of POWER SUPPLY UNIT 1000. FLOP 1006*a* may correspond to FLOP 206 from FIG. 2, providing an output, Qp1, corresponding to the most recent previous state of POWER SUPPLY UNIT 1000. In various embodiments, POWER SUPPLY UNIT 1000 may include flip flop, FLOP 1006*b*, which may store the output of FLOP 1006*a*. BUFFER 1008 may be used to add a slight delay to sa_enable, so that FLOP 1006*b* will store the value of Qp1 before it is updated to its new value. As a result, once STATICIZER 1005, FLOP 1006*a*, and FLOP 1006*b* have updated their respective outputs, then BIAS SELECT 1007 may have three inputs to use to select a Vbias output level, Qc being the current state, Qp1 being the state from the previous comparison cycle, and Qp2 being the state from two comparison cycles previous. With these three inputs, BIAS SELECT 1007 now may select from eight possible Vbias outputs, as shown in Table 2. The term Vpower_supply in Table 2 refers to the power supply voltage.

TABLE 2

| Bias Voltage Selection with 2 Previous States | | | |
|---|---|---|---|
| Qc | Qp1 | Qp2 | Vbias |
| low | low | low | GROUND |
| low | low | high | Vpower_supply * 0.15 |
| low | high | low | Vpower_supply * 0.30 |
| low | high | high | Vpower_supply * 0.45 |
| high | low | low | Vpower_supply * 0.60 |
| high | low | high | Vpower_supply * 0.75 |
| high | high | low | Vpower_supply * 0.90 |
| high | high | high | Vpower_supply |

By having more possible Vbias levels with smaller voltage deltas between each level, the changes to output of the POWER SUPPLY UNIT 1000 may be more gradual, which may result in less ripple than is present when only four Vbias levels are used. The Vbias outputs shown in Table 2 are only examples. In a given application, the Vbias voltage levels may be selected to provide the best performance for the functional blocks that may be coupled to POWER SUPPLY UNIT 1000. Additionally, more flip-flops may be used to save even more previous sates, further increasing the number of potential Vbias voltage levels that may be selected. FLOP 1006*b* may be designed according to one of various design styles. For example, FLOP 1006*b* may employ one or more flip-flops, a shift register, a small RAM or any other suitable circuit for storing a sequence of one or more bits of data.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a reference voltage circuit configured to provide one or more analog voltages responsive to receiving an enable signal; and
   a voltage generation circuit, coupled to the reference voltage circuit, wherein the voltage generation circuit is configured to:
      enable the reference voltage circuit by asserting the enable signal;
      receive a given one of the one or more analog voltages from the reference voltage circuit;
      generate an output signal;
      determine if the given one of the one or more analog voltages is stable;
      compare, in response to the determination the given one of the one or more analog voltages is stable, a voltage level of the output signal to the given one of the one or more analog voltages;
      detect a first operational state, wherein a value of the first operational state indicates a result of the comparison;
      de-assert the enable signal;
      store the value of the first operational state; and
      adjust the voltage level of the output signal dependent upon the stored value of the first operational state and a stored value of a second operational state, wherein the value of the second operational state is stored prior to storing the value of the first operational state.

2. The apparatus of claim 1, further comprising a sense amplifier configured to:
   compare the voltage level of the output signal to the given one of the one or more analog voltages; and
   generate a plurality of digital signals dependent upon the comparison.

3. The apparatus of claim 2, further comprising a digital hybrid amplifier configured to adjust the voltage level of the output signal dependent upon the generated plurality of digital signals, wherein the digital hybrid amplifier comprises a Metal-Oxide-Semiconductor Field-Effect Transistor (MOSFET), wherein the MOSFET is coupled between a supply voltage and the output signal.

4. The apparatus of claim 2, wherein to de-assert the enable signal, the voltage generation circuit is further configured to de-assert the enable signal in response to the sense amplifier generating a valid output, wherein an output of the sense amplifier is considered valid upon the sense amplifier outputting a first digital signal and a second digital signal, wherein the second digital signal is an inverse of the first digital signal.

5. The apparatus of claim 1, wherein to de-assert the enable signal, the voltage generation circuit is further configured to de-assert the enable signal in response to the completion of the comparison of the voltage level of the output signal and the given one of the one or more analog voltages.

6. The apparatus of claim 1, wherein to compare the output signal to the given one of the one or more analog voltages, the voltage generation circuit is further configured to determine that the reference voltage circuit is ready for the comparison.

7. The apparatus of claim 1, wherein to enable the reference voltage circuit, the voltage generation circuit is further configured to receive a periodic signal and to enable the reference voltage circuit in response to a rising edge of the received periodic signal.

8. A method for generating a voltage level, comprising:
   enabling a voltage reference circuit;
   receiving an analog voltage from the voltage reference circuit;
   generating an output signal, wherein a voltage level of the output signal is set to a pre-determined target voltage level;
   determining if the analog voltage is stable;
   comparing, in response to the determination the analog voltage is stable, the voltage level of the output signal to the analog voltage;
   detecting a first operational state, wherein a value of the first operational state indicates a result of the comparison;
   disabling the voltage reference circuit;
   storing the value of the first operational state; and
   adjusting the voltage level of the output signal dependent upon the stored value of the first operational state and a stored value of a second operational state, wherein the value of the second operational state is stored prior to storing the value of the first operational state.

9. The method of claim 8 wherein comparing the voltage level of the output signal comprises:
   enabling a sense amplifier coupled to the output signal and the received analog voltage; and
   generating, by the sense amplifier, a plurality of digital signals dependent upon the voltage level of the output signal and the received analog voltage.

10. The method of claim 8, further comprising comparing the voltage level of the output signal to the analog voltage in response to a determination that the voltage reference circuit is stable.

11. The method of claim 8, wherein adjusting the voltage level of the output signal comprises sending a digital hybrid amplifier a digital input value including the stored value of the first operational state and the stored value of the second operational state.

12. The method of claim 8, further comprising disabling the voltage reference circuit in response to the completion of the comparison of the voltage level of the output signal to the received analog voltage.

13. The method of claim 12, wherein enabling the voltage reference circuit includes:
   receiving a periodic signal; and
   detecting a falling edge on the periodic signal.

14. A system, comprising:
   a voltage supply circuit, configured to:
      enable one or more analog voltage signals responsive to receiving an enable signal;
      generate an output voltage signal;
      determine if the one or more analog voltage signals are stable;
      compare, in response to the determination, a given one of the analog voltage signals to the output voltage signal;
      generate a first value based on the comparison;
      disable the generation of the one or more analog voltage signals in response to the generation of the first value;
      store the first value; and adjust the output voltage signal dependent upon the stored first value and a stored second value, wherein the stored second value is stored prior to storing the first value;

a host processor, coupled to the voltage supply circuit, wherein the host processor is configured to enable and disable the voltage supply; and a memory, coupled to the voltage supply, wherein, the memory is configured to receive the output voltage signal from the voltage supply.

15. The system of claim 14, wherein to compare the level of the output voltage signal to the given one of the one or more analog voltages, the voltage supply circuit is further configured to output one or more digital signals based on the comparison.

16. The system of claim 14, wherein the voltage supply circuit is further configured to disable generation of the one or more analog voltage signals dependent upon completing the comparison of the output voltage signal to the given one of the one or more analog voltage signals.

17. The system of claim 14, wherein the voltage supply circuit includes a Metal-Oxide-Semiconductor Field-Effect Transistor (MOSFET), wherein the MOSFET is coupled between a supply voltage and the output voltage signal.

18. The system of claim 14, wherein the voltage supply circuit is further configured to receive a periodic signal, wherein a falling edge of the received periodic signal enables generation of the one or more analog voltage signals.

19. The system of claim 14, wherein the voltage supply circuit is further configured to receive a periodic signal, wherein a rising edge of the received periodic signal enables generation of the one or more analog voltage signals.

20. The system of claim 14, wherein the voltage supply circuit includes a digital hybrid amplifier, and wherein to adjust the output voltage signal dependent upon the stored first value and the stored second value, the voltage supply circuit is further configured to send a digital input value including the stored first value and the stored second value to the digital hybrid amplifier.

* * * * *